(12) United States Patent
Falk-Jordan

(10) Patent No.: US 11,226,316 B2
(45) Date of Patent: Jan. 18, 2022

(54) DUAL MATERIAL APPROACH FOR HIGH PRESSURE BIOINERT FLOW PATH COMPONENTS

(75) Inventor: Stefan Falk-Jordan, Karlsruhe (DE)

(73) Assignee: Agilent Technologies, Inc, Santa Clara, CA (US)

( * ) Notice: Subject to any disclaimer, the term of this patent is extended or adjusted under 35 U.S.C. 154(b) by 1466 days.

(21) Appl. No.: 13/302,398

(22) Filed: Nov. 22, 2011

(65) Prior Publication Data

US 2012/0160754 A1 Jun. 28, 2012

(30) Foreign Application Priority Data

Dec. 22, 2010 (GB) .................................... 1021705

(51) Int. Cl.
*G01N 30/60* (2006.01)
*G01N 30/22* (2006.01)
*B01L 3/00* (2006.01)
*B01D 15/14* (2006.01)

(52) U.S. Cl.
CPC .... *G01N 30/6026* (2013.01); *B01L 3/502707* (2013.01); *G01N 30/22* (2013.01); *B01D 15/14* (2013.01); *B01L 2300/12* (2013.01); *B01L 2300/163* (2013.01); *Y10T 29/49826* (2015.01); *Y10T 29/49865* (2015.01); *Y10T 29/49993* (2015.01)

(58) Field of Classification Search
CPC ........ B29C 2793/00; B29C 2793/0018; B29C 65/00; B29C 65/42; B29C 65/70
USPC ................................................ 422/545, 546
See application file for complete search history.

(56) References Cited

U.S. PATENT DOCUMENTS

| | | | |
|---|---|---|---|
| 5,614,154 A | 3/1997 | Glatz et al. | |
| 5,736,036 A | 4/1998 | Upchurch et al. | |
| 6,290,791 B1 * | 9/2001 | Shaw | B01J 19/0093 156/275.7 |
| 7,311,882 B1 * | 12/2007 | Renzi | B01L 3/565 285/120.1 |
| 8,585,986 B1 * | 11/2013 | Renzi | B01L 3/565 422/544 |
| 2003/0017305 A1 * | 1/2003 | Roitman | B01L 3/502707 428/156 |
| 2006/0151998 A1 | 7/2006 | Dourdeville et al. | |
| 2006/0157131 A1 | 7/2006 | Harris et al. | |
| 2009/0101580 A1 * | 4/2009 | Lubda et al. | 210/656 |

FOREIGN PATENT DOCUMENTS

| WO | 91/00470 A1 | 1/1991 |
|---|---|---|
| WO | 2004007077 A1 | 1/2004 |
| WO | 2006/083597 A2 | 8/2006 |
| WO | 2007/038003 A1 | 4/2007 |

OTHER PUBLICATIONS

Search Report dated Apr. 26, 2011, by the United Kingdom Intellectual Property Office, in related Application No. GB1021705.7 (3 pages).
U.K. Examination Report dated Sep. 13, 2016 from related U.K. Application No. GB1021705.7.

* cited by examiner

Primary Examiner — Kara M Peo

(57) ABSTRACT

A method of manufacturing a component having a flow path, wherein the method includes forming a high pressure resistant casing with a cavity therein, inserting a body of bioinert material into the cavity to thereby form a composite block, and further processing the composite block for at least partially forming the flow path defined by the component.

22 Claims, 5 Drawing Sheets

DUAL MATERIAL APPROACH FOR HIGH PRESSURE BIOINERT FLOW PATH COMPONENTS

CROSS REFERENCE TO RELATED APPLICATIONS

This claims priority of a British Application No. GB1021705.7, filed on Dec. 22, 2010, the disclosure of which is incorporated by reference in its entirety.

BACKGROUND ART

The present invention relates to the manufacturing of components for an analysis system.

In liquid chromatography, a fluidic analyte may be pumped through a column comprising a material which is capable of separating different components of the fluidic analyte. Such a material, so-called beads, may be filled into a column tube which may be connected to other elements (like a control unit, containers including sample and/or buffers). Upstream of a column, the fluidic analyte is loaded into the liquid chromatography device. A controller controls an amount of fluid to be pumped through the liquid chromatography device, including controlling a composition and time-dependency of a solvent interacting with the fluidic analyte. Such a solvent may be a mixture of different constituents. The supply of these constituents for subsequent mixing is an example of an operation to be designed by an operator of a liquid chromatography device. In modern applications, biological samples may be pumped through a corresponding flow path at very high pressure, for instance up to 1200 bar.

WO 91/00470 discloses a tube fitting particularly adapted to inert polymeric tubing which has a polymeric plug with a tapered seat and a relief portion in a bore, the plug being received in a case having a threaded port adjacent the plug bore. A ferrule and a threaded nut seal the polymeric tube to the plug. The ferrule may be extended through the nut bore and be retained in the nut by a flange at the outer end of the nut. The fitting may include further gripping means to resist axial pulling of the polymeric tube.

However, conventional components for high pressure fluid handling systems may still be problematic in manufacture with reasonable effort. This particularly holds when fluidic biological samples need to be treated with a pressure of 1200 bar or more using such components.

DISCLOSURE

It is an object of the invention to manufacture components for high pressure fluid handling systems in an efficient manner.

According to an exemplary embodiment of the present invention, a method of manufacturing a component having a flow path is provided, wherein the method comprises forming a high pressure resistant casing with a cavity therein, inserting a bioinert material into the cavity to thereby form a composite block, and further processing the composite block for at least partially forming the flow path defined by the component.

According to another exemplary embodiment, a component is provided having a flow path for conducting a fluid, the component being manufactured according to the above-mentioned method.

According to still another exemplary embodiment, a fluid separation system, particularly a liquid chromatography system, is provided for separating compounds of a fluid, wherein the fluid separation system comprises a fluid delivering unit (such as a pump) for delivering the fluid to a flow path, a separation unit adapted for separating compounds of the fluid and being arranged along the flow path, and at least one component having the above mentioned features, made of a composite and having at least a part of the flow path for conducting the fluid.

According to yet another exemplary embodiment, an analysis system for analyzing a fluid is provided, the analysis system comprising a component having the above-mentioned features.

In the context of this application, the term "component" may particularly denote any member of an apparatus to be used in a fluid flow application, i.e. contributing to a flow path along which a fluid may be conducted. Such a component may provide an assigned function or contribution to the fluidic system in combination with further components.

The term "flow path" may particularly denote any fluidic conduit along which a fluid can be conducted or guided in a predictable manner from a fluid inlet interface to a fluid outlet interface. The flow path may be linear or curved, may comprise one or more lumens, and may be bifurcated or not bifurcated.

The term "bioinert" may particularly denote a property combining biocompatibility with biological or biochemical substances and inertness against aggressive chemical environments, such as chemical environments having extreme pH values. Biocompatibility may be denoted as the capability to exist in harmony with biological material such as macro-molecules like proteins or genes. It may also denote the quality of not having toxic effects on biological systems. Regarding inertness, the bioinert material should be inert against extreme pH-values such as pH-values in the entire range of 1 to 14. Hence, even in the presence of a strongly ionizing chemical environment, a bioinert material will not or at least not substantially be deteriorated. For example, monoclonal antibodies, proteins, etc. may be harmed or negatively affected by ions, as well as components of a liquid chromatography device such as chromatographic columns or mass spectroscopy devices may be harmed or negatively affected by ions. Hence, the inert property of the material means that no meaningful amount of ions is generated by this material in the presence of pH values in the range of 1 to 14. Bioinert materials such as polyetheretherketone (PEEK) alone will however not be capable of withstanding pressure values of more than for instance 600 bar. To meet this shortcoming, an embodiment of the invention provides a composite material of such a bioinert material and a surrounding support structure, which ensures a significantly higher robustness.

The term "composite block" may particularly denote a bulk body of solid material being a composition of exactly two materials or more than two materials together forming a continuous semifinished product ready for further processing. Thus, the composite block may be an integrally formed structure which may or may not have one or more recesses.

The term "further processing" may particularly denote the execution of at least one additional method step of treating the composite block subsequently to its formation by cavity production and inserting. In other words, the flow path is at least partially formed after already having inserted the bioinert material into the cavity. Such a further processing may include the defined removal of a part of the material of the composite block.

According to an exemplary embodiment, a dual material approach for forming a member with a high pressure bioinert flow path is provided. This concept 5 allows to configure one or more flow paths within a component such as a fitting or a valve for fluidic applications in a bioinert way (for instance using PEEK material or other polymers), while at the same time guaranteeing a pressure stability up to for instance 600 bar or more by correspondingly configuring a casing around the bioinert block. Bioinert materials such as PEEK may in some instances not have the capability 10 to withstand high pressures of for example more than 600 bar. Hence, if such a material were to be used alone, this could result in breakage or leakage of the component at high pressure values. In order to overcome this shortcoming, an exemplary embodiment teaches to use a bioinert material to define the flow path, while integrating such a material into a surrounding support structure which provides the 15 high pressure stability. In contrast to a mere coating of a support structure with a thin layer of a polymer, it is possible by embodiments of the invention to use opportunities of mechanical post-processing of the bioinert bulk block to manufacture also very small geometries of flow paths, while at the same time guaranteeing that the length of the flow paths can be sufficiently large. Thus, by providing the bioinert block as a bulk structure, a sufficiently thick three-dimensional body is provided for forming the flow paths. At the same time, a direct contact of the fluid to a for instance metallic material of the casing can be reliably prevented. Due to this synergetic combination of the two materials prior to the processing of the flow paths, it is also possible to precisely realize the alignment of the geometry in both materials. Such a dual material configuration further allows to locate and process features or elements within the stable casing material which require a high degree of mechanical stability such as threads.

In the following, further exemplary embodiments of the method will be explained. However, these embodiments also apply to the component, to the fluid separation system, and to the analysis system.

In an embodiment, inserting the bioinert material into the cavity comprises assembling a solid body of the bioinert material to the casing. Thus, a readily formed body may be inserted into the cavity as a whole.

In an embodiment, this assembling comprises adhering the body to the casing. Hence, glue or the like may be used for rigidly connecting the body to the casing, which will render the manufactured component compatible with high pressure applications. For instance, adhering the bioinert body to the casing may be performed by using an epoxy glue or the like.

In an embodiment, the assembling comprises effecting (for instance by heating and/or cooling) a temperature difference between the body and the casing so that a temperature of the body is below a temperature of the casing, inserting the body into the casing while the temperature difference is maintained, and subsequently thermally equilibrating the body and the casing. In one alternative, the assembling comprises bringing the body to a lower temperature than the casing (by cooling), inserting the body at the lower temperature into the casing, and subsequently thermally equilibrating the body and the casing. In another alternative, the assembling comprises bringing the casing to a higher temperature than the body (by heating), inserting the body into the casing at the higher temperature, and subsequently thermally equilibrating the body and the casing. Such an embodiment may make use of the thermal expansion of materials. By cooling the body and/or heating the casing prior to the assembly, it is possible to introduce the body into the cavity of the casing with some clearance before allowing the temperatures of body and casing to equilibrate. Thermal equilibration will then result in a rigid connection of the body within the casing, since the thermal balancing will remove the different thermal expansion.

In an embodiment, inserting the bioinert material into the cavity comprises injecting the bioinert material in a liquid state into the cavity, and subsequently solidifying the bioinert material in the cavity. For example, this bioinert material may be formed by injecting-molding or the like in which the liquid bioinert material (for instance a liquid plastic material) is injected into the cavity and is allowed to solidify or harden in the cavity, thereby at the same time forming a fixed connection between casing and bioinert material.

In an embodiment, the composite block is further processed so that the flow path is delimited exclusively by bioinert material without direct contact between material of the casing and a fluid to be conducted along the flow path. By taking this measure, any undesired biochemical deterioration of the sample and also of the surrounding material may be safely prevented, since the entire flow path of the fluid will be defined by the bioinert material. By taking this measure, also undesired carryover of fluidic sample material can be securely prevented.

In an embodiment, the further processing comprises turning, milling, pressing and/or eroding. Turning may be denoted as a process in which a piece of material is rotated and a cutting tool is traversed along for instance two axes of motion to produce precise diameters and depths. Milling machines may also move a workpiece radially against a rotating milling cutter, which cuts on its sides as well as its tip. Pressing may involve the application of a pressing force onto a workpiece to process it. Eroding procedures may remove material from the composite block. However, other processing methods are possible as well, additionally or alternatively.

In an embodiment, the cavity is formed in the casing with an undercut. The term "undercut" may particularly denote a special type of recessed surface. It may be a recess in a diameter or a recess in a corner. Particularly, it may denote to cut-away material from a portion of an object so as to leave an overhanging portion in relief.

In an embodiment, the method comprises forming at least one thread exclusively in material of the casing. By forming one or more internal or external threads of the component only in material of the casing and not in material of the bioinert block, benefit may be made of the high mechanical stability of the casing material. Thus, it may be ensured that, even under high pressure applications, a thread may remain non-deteriorated and that abrasion of material of the thread is avoided, even when the thread is used with a corresponding counterpart, such as a screw, which may often be the case.

In an embodiment, the composite block is further processed for at least partially forming at least one connectivity, particularly at least one of a thread and a guide structure, for connection to the flow path. Thus, although the part of the flow path, which is in direct contact with the fluid, should only be made from the bioinert material, a pressure-stable connection to other members may be ensured by the connectivity formed and/or inserted in the composite block. Hence, also the connection of the flow path to a surrounding member may be performed in the dual material component.

In an embodiment, the casing is made of a material being pressure-resistant at least up to about 600 bar, particularly at least up to about 1200 bar. Such pressure values may occur particularly in modern fluid separation processes like in a HPLC (High Performance Liquid Chromatography) or UHPLC (Ultra-High Performance Liquid Chromatography).

In an embodiment, the casing is made of a single material. Since the primary function of the casing is to provide mechanical stability, the casing material may be specifically selected so as to meet this requirement.

In an embodiment, the casing comprises a metal, particularly stainless steel, construction steel or titanium. Particularly, stainless steel may be preferred, since it is properly proces sable and has a high mechanical stability.

In an embodiment, the bioinert material is made of a single material. Since the primary function of the bioinert material is the property of guiding fluids in very small quantities or flow rates, the material of the bioinert component may be selected in accordance with this function.

When providing each of the casing and the bioinert material from one material, respectively, a total of only two materials are needed for manufacturing the component. In this case, compatibility of only two materials (the casing material and the bioinert material) needs to be considered.

In an embodiment, the bioinert material comprises a plastic or a polymer such as polyetheretherketone or polytetrafluoroethylene, or a ceramic such as aluminum oxide, zirconium oxide or yttrium-stabilized zirconium oxide. Such materials are particularly appropriate for conducting very small flow rates, allowing formation of very small conduits therein, and at the same time are capable of keeping carry-over of samples in different analysis procedures very small.

In an embodiment, the composite block is further processed for manufacturing a component for a life science apparatus, particularly for a liquid chromatography apparatus. More particularly, the component may be a fitting for an injection needle or a fluidic valve. In a sample loop of a liquid chromatography apparatus, a sample may be injected into a fluidic path by a mechanically drivable needle. The drivable needle is controllable to be moved out of a seat of the sample loop into a vial to receive a fluid and back from the vial into the seat. Such a movable injection needle may be mounted in a fitting in a fluid-tight way to allow for a conduction and processing of fluid even in high-pressure applications. In case of the need to switch between different fluid operation modes, a fluidic valve may be provided, which is for instance rotatable, so as to selectively enable or disable specific flow paths in view of the rotation. Both an injection needle and a fluidic valve are fluidic components, which are critical under high-pressure applications and can fulfill their high mechanical stability requirement and low flow rate requirements synergetically by the dual material approach according to exemplary embodiments.

In an embodiment, the bioinert material is at least partially, particularly completely, embedded in and surrounded by material of the casing. By such a partial or even entire surrounding, any mechanical loads acting on the bioinert material, for instance under high-pressure applications, may be forwarded to the surrounding casing, which has a capability to support the bioinert material against such high loads.

In an embodiment, the flow path or fluidic conduit is formed with an inner diameter in a range between about 25 µm and about 1000 µm, particularly in a range between about 50 µm and about 500 µm. Particularly with such small diameters, which can be formed in bioinert material blocks, even microfluidic and nanofluidic applications can be realized, while at the same time enabling high-pressure applications in such small fluidic conduits. When the flow paths have a diameter of less than 25 µm, the flow rates may become very small and friction may become an issue. If the flow paths have a diameter of more than 1000 µm, a simple coating of a metal with a thin layer of PEEK or the like is sufficient. The formation of significantly smaller diameters is however problematic with a mere coating technology. Hence, within the given ranges, the two material composite approach according to exemplary embodiments is particularly advantageous.

In an embodiment, the method comprises forming at least one bore in the casing prior to the inserting. Thus, apart from the formation of the flow path, guiding structures for accessing the flow path from an exterior position can be formed before actually forming the composite blocks or at least prior to the finishing of the flow path by the further processing subsequently to the formation of the composite block.

In the following, further exemplary embodiments of the analysis system and of the fluid separation system will be explained. However, these embodiments also apply to the component and to the method.

In an embodiment, the analysis system is configured as at least one of the group consisting of an autosampler device, a fractioner device, a measurement device for performing a measurement in a coupled measurement environment, a measurement device for measuring at least one physical, chemical or biological parameter, a measurement device for performing a measurement of a fluidic sample, a sensor device, a device for chemical, biological and/or pharmaceutical analysis, a fluid separation system configured for separating compounds of a fluid, a test device for testing a device under test or a substance, a capillary electrophoresis device, a liquid chromatography device, a gas chromatography device, an electronic measurement device, and a mass spectroscopy device.

The analysis system may further comprise a pump configured for pumping fluid through the system. As a pump, a piston pump, a peristaltic pump, etc., may be implemented.

The analysis system may comprise a sample loop for handling a fluidic sample. Such a sample loop may be part of a liquid chromatography apparatus and may allow a sample to be injected into the sample loop via the needle at an end portion of a capillary, which can be pivoted from the seat of the sample loop to immerse into a fluid end. After having taken up the fluid, the needle can be moved back into the seat so that the injected fluid can be introduced via the sample loop onto a chromatographic column for fluid separation. Such a fluid separation may then be performed by separately releasing different fractions of a sample trapped on the chromatographic column by running a gradient during which a solvent with varying composition may be conducted through the chromatographic column.

In an embodiment, the analysis system may be configured as an autosampler for injecting a fluidic sample in an apparatus being in fluid communication with a capillary. Such an autosampler may be a device or module which, in an automatic manner, allows to handle fluid in a specific manner, for instance in accordance with a dedicated mechanism of controlling different vials so that a specific sample composition may be adjusted.

In an embodiment, the above mentioned apparatus served by the autosampler may be a chromatographic column. Therefore, the autosampler may take up a sample and may inject the sample towards a chromatographic column for sample separation.

The analysis system may thus include or cooperate with a processing element (such as a chromatographic column) filled with a separating material. Such a separating material which may also be denoted as a stationary phase may be any material which allows an adjustable degree of interaction with a sample so as to be capable of separating different components of such a sample. The separating material may be a liquid chromatography column filling material or packing material comprising at least one of the group consisting of polystyrene, zeolite, polyvinylalcohol, polytetrafluorethylene, glass, polymeric powder, silicon dioxide, and silica gel, or any of above with chemically modified (coated, capped etc) surface. However, any packing material can be used which has material properties allowing an analyte passing through this material to be separated into different components, for instance due to different kinds of interactions or affinities between the packing material and fractions of the analyte.

At least a part of the processing element may be filled with a fluid separating material, wherein the fluid separating material may comprise beads having a size in the range of essentially 1 μm to essentially 50 μm. Thus, these beads may be small particles which may be filled inside the separation section of the microfluidic device. The beads may have pores having a size in the range of essentially 0.01 μm to essentially 0.2 μm. The fluidic sample may be passed through the pores, wherein an interaction may occur between the fluidic sample and the pores.

The analysis system may be configured as a fluid separation system for separating components of the sample. When a mobile phase including a fluidic sample passes through the fluidic device, for instance with a high pressure, the interaction between a filling of the column and the fluidic sample may allow for separating different components of the sample, as performed in a liquid chromatography device.

However, the analysis system may also be configured as a fluid purification system for purifying the fluidic sample. By spatially separating different fractions of the fluidic sample, a multi-component sample may be purified, for instance a protein solution. When a protein solution has been prepared in a biochemical lab, it may still comprise a plurality of components. If, for instance, only a single protein of this multi-component liquid is of interest, the sample may be forced to pass the columns. Due to the different interaction of the different protein fractions with the filling of the column (for instance using a gel electrophoresis device or a liquid chromatography device), the different samples may be distinguished, and one sample or band of material may be selectively isolated as a purified sample.

The analysis system may be configured to analyze at least one physical, chemical and/or biological parameter of at least one component of the mobile phase. The term "physical parameter" may particularly denote a size or a temperature of the fluid. The term "chemical parameter" may particularly denote a concentration of a fraction of the analyte, an affinity parameter, or the like. The term "biological parameter" may particularly denote a concentration of a protein, a gene or the like in a biochemical solution, a biological activity of a component, etc.

The analysis system may be configured to conduct a liquid mobile phase through the processing element and optionally a further processing element. As an alternative to a liquid mobile phase, a gaseous mobile phase or a mobile phase including solid particles may be processed using the fluidic device. Also materials being mixtures of different phases (solid, liquid, gaseous) may be processed using exemplary embodiments. The sample separation device may be configured to conduct the mobile phase through the system with a high pressure, particularly of at least 600 bar, more particularly of at least 1200 bar.

The analysis system may be configured as a microfluidic device. The term "microfluidic device" may particularly denote a fluidic device as described herein which allows to convey fluid through microchannels having a dimension in the order of magnitude of less than 500 μm, particularly less than 200 μm, more particularly less than 100 μm or less than 50 μm or less. The analysis system may also be configured as a nanofluidic device. The term "nanofluidic device" may particularly denote a fluidic device as described herein which allows to convey fluid through nanochannels with a flow rate of less than 100 nl/min, particularly of less than 10 nl/min.

BRIEF DESCRIPTION OF DRAWINGS

Other objects and many of the attendant advantages of embodiments of the present invention will be readily appreciated and become better understood by reference to the following more detailed description of embodiments in connection with the accompanied drawings. Features that are substantially or functionally equal or similar will be referred to by the same reference signs.

Figure 1:
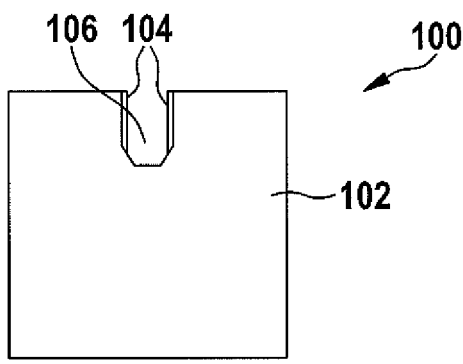
FIG. 1 shows a cross-section obtained during executing a method of manufacturing a component having a flow path according to an exemplary embodiment of the invention.

The illustrations in the drawings are schematic.

Figure 12:
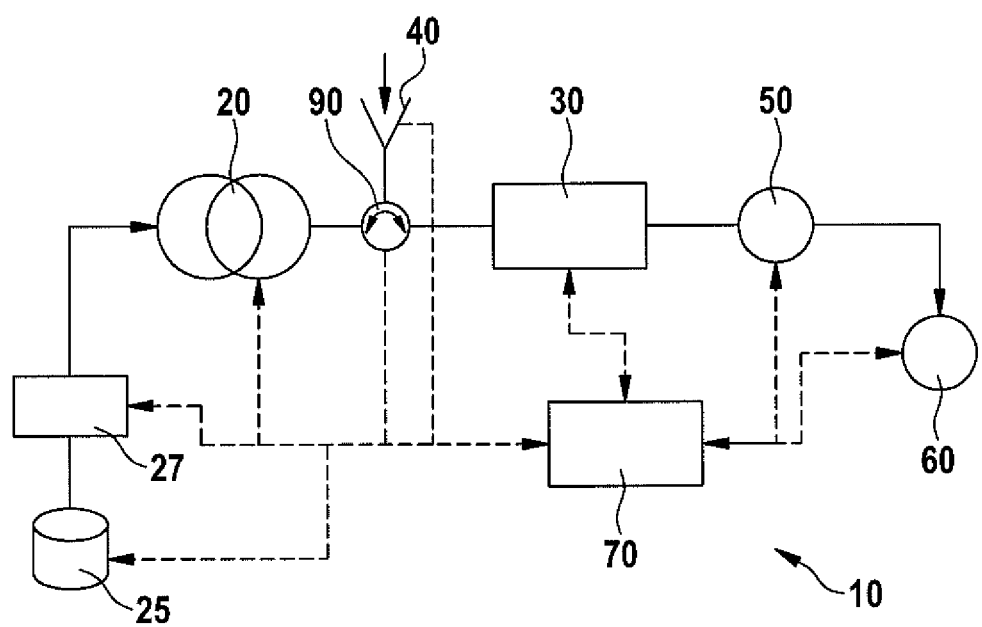
FIG. 12 shows a liquid chromatography apparatus having components which may be manufactured by a method of manufacturing a component having a flow path according to an exemplary embodiment of the invention.

Referring now in greater detail to the drawings, FIG. 12 depicts a general schematic of a liquid separation system 10. A pump 20 receives a mobile phase from a solvent supply 25, typically via a degasser 27, which degases and thus reduces the amount of dissolved gases in the mobile phase. The pump 20—as a mobile phase drive—drives the mobile phase through a separating device 30 (such as a chromatographic column) comprising a stationary phase. A sampling unit 40 can be provided between the pump 20 and the separating device 30 in order to subject or add (often referred to as sample introduction) a fluidic sample into the mobile phase. The stationary phase of the separating device 30 is adapted for separating compounds of the fluidic sample. A detector 50 is provided for detecting separated compounds of the fluidic sample. A fractionating unit 60 can be provided for outputting separated compounds of the fluidic sample.

While the mobile phase can be comprised of one solvent only, it may also be mixed from plural solvents. Such mixing might be a low pressure mixing and provided upstream of the pump 20, so that the pump 20 already receives and pumps the mixed solvents as the mobile phase. Alternatively, the pump 20 might be comprised of plural individual pumping units, with plural of the pumping units each receiving and pumping a different solvent or mixture, so that the mixing of the mobile phase (as received by the separating device 30) occurs at high pressure and downstream of the pump 20 (or as part thereof). The composition (mixture) of the mobile phase may be kept constant over time, the so called isocratic mode, or varied over time, the so called gradient mode.

A data processing unit 70, which can be a PC or workstation, might be coupled (as indicated by the dotted arrows) to one or more of the devices in the liquid 25 separation system 10 in order to receive information and/or control operation. For example, the data processing unit 70 might control operation of the pump 20 (for instance setting control parameters) and receive therefrom information regarding the actual working conditions (such as output pressure, flow rate, etc. at an outlet of the pump 20). The data processing unit 70 might also control operation of the solvent supply 30 25 (for instance setting the solvent/s or solvent mixture to be supplied) and/or the degas ser 27 (for instance setting control parameters such as vacuum level) and might receive therefrom information regarding the actual working conditions (such as solvent composition supplied over time, flow rate, vacuum level, etc.). The data processing unit 70 might further control operation of the sampling unit 40 (for instance controlling sample injection or synchronization of sample injection with operating conditions of the pump 20). The separating device 30 might also be controlled by the data processing 5 unit 70 (for instance selecting a specific flow path or column, setting operation temperature, etc.), and send—in return—information (for instance operating conditions) to the data processing unit 70. Accordingly, the detector 50 might be controlled by the data processing unit 70 (for instance with respect to spectral or wavelength settings, setting time constants, start/stop data acquisition), and send information (for instance about the detected sample compounds) to the data processing unit 70. The data processing unit 70 might also control operation of the fractionating unit 60 (for instance in conjunction with data received from the detector 50) and provide data back.

Reference numeral 90 schematically illustrates a switchable valve which is controllable for selectively enabling or disabling specific fluidic paths within apparatus 10. The switchable valve 90 is not limited to the position between the pump 20 and the separating device 30 and can also be implemented at other positions, depending on the application.

The shown components of the liquid separation system 10 may be subject to very high pressure such as 1200 bar during operation. Hence, methods of manufacturing such components to meet high pressure requirements according to exemplary embodiments will be explained in the following.

Next, referring to FIG. 1 to FIG. 4, a method of manufacturing a component having a flow path according to an exemplary embodiment of the invention will be explained.

As can be taken from FIG. 1, a metal block 100 is shown, which is a recessed solid body consisting of a high-pressure resistant casing 102, which may be made of stainless steel. A recess or bore 106 has been formed in the metal block 102, wherein an internal thread 104 is formed in the cylindrical recess or bore 106 for later connecting a screw or the like.

Figure 2:
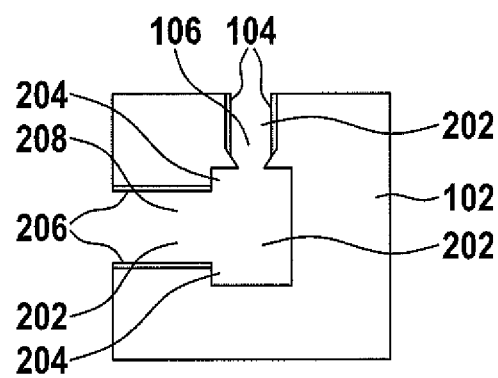
FIG. 2 shows another cross-section obtained during executing the method associated with FIG. 1.

As can be taken from FIG. 2, a larger cavity 202 is formed in the metal block 102 comprising a central accommodation space with an undercut 204 as well as an additional threaded bore 208. Thus, the arrangement of FIG. 2 can be denoted as a high-pressure resistant casing 102 with a cavity 202 formed therein.

In order to obtain the structure shown in FIG. 3, liquid plastic material (or other bioinert material) can be inserted into the cavity 202 and can be subsequently solidified into a body 302 to thereby form a composite block 300 together with the casing 102. In the present embodiment, the plastic material is inserted in the liquid form into a central part of the cavity 202 including the portion having the undercut 204. After hardening, the composite block 300 remains as a dual material block serving as a blank forming a basis for further subsequent processing. Due to the undercut 204, the solidified plastic material of the body 302 is fixed in an interior of the casing 102.

Figure 4:
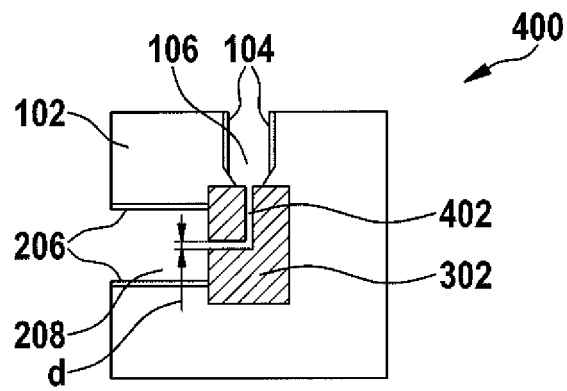
FIG. 4 shows another cross-section obtained during executing the method associated with FIG. 1.

As can be taken from FIG. 4, the composite block 300 is then further processed by drilling or etching to form the flow path 402 of the component 400. An inner diameter of the cylindrical conduit defining the flow path 402 is denoted as "d" and is 50 µm.

In a shown embodiment, the flow path 402 may for instance be drilled in the body 302 of the bioinert material, so that a fluid such as a biological fluid, being conducted through the component 400, will only contact material of the bioinert block 302 when flowing through the component 400. Fittings or guide connections may be screwed into the screw holes, i.e. the bores 106, 208 with the internal threads 104, 206, so that the formation of these threads 104, 206 in the metal material of the block 102 ensures that even when using these screw connections multiple times, there is no deterioration of the performance of the component 400.

While the bioinert material is inserted into the cavity 202 in the embodiment of FIG. 1 to FIG. 4 in a liquid state, FIG. 5 to FIG. 8 shows an alternative embodiment, in which bioinert material is assembled as a preformed solid body into a cavity of the casing.

Figure 5:
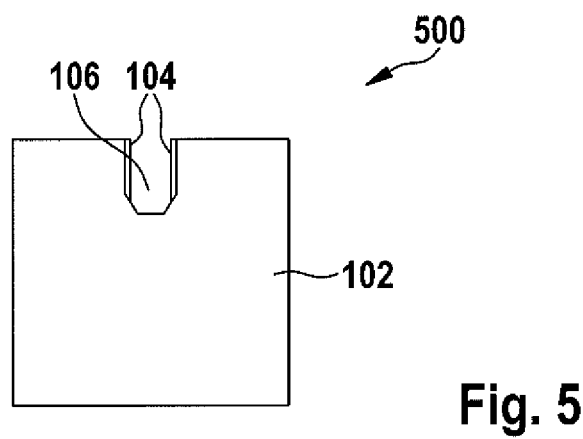
FIG. 5 shows a cross-section obtained during executing a method of manufacturing a component having a flow path according to another exemplary embodiment of the invention.
Figure 6:
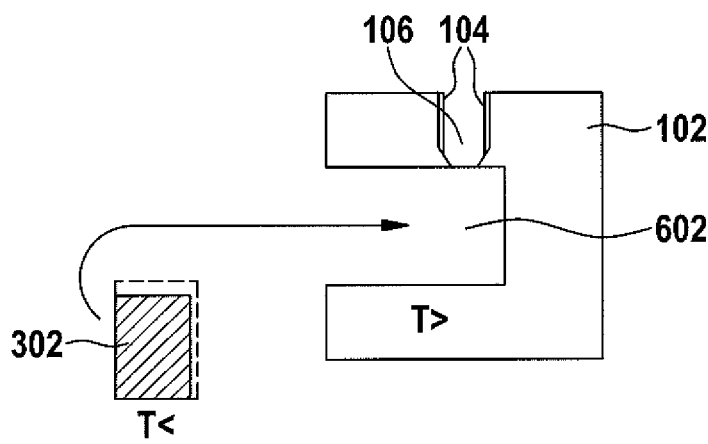
FIG. 6 shows another cross-section obtained during executing the method associated with FIG. 5.

FIG. 5, in which a metal block 500 is shown, corresponds to FIG. 1. However, as can be taken from FIG. 6, in the shown embodiment, a cavity 602 is formed into the casing 102 without undercut. Moreover, a readily formed solid bioinert material 302 block is inserted into the cavity 602 after having reduced the temperature of the body 302 as compared to a temperature of the metal casing 102. In other words, this may be achieved by cooling the body 302 and/or by heating the metal block 102, or more generally, by adjusting the thermal conditions so that $T_{>} \gg T_{<}$ (temperatures). In this state, the body 302 may be inserted with some clearance into the cavity 602, since the reduction of the temperature of the body 302 has also reduced its dimensions by thermal contraction. By subsequently allowing the temperature of metal body 102 and PEEK body 302 of inert material to equilibrate, the body 302 will automatically be pressed against and therefore fastened to the surrounding metal block 102, as can be taken from FIG. 7.

Figure 3:
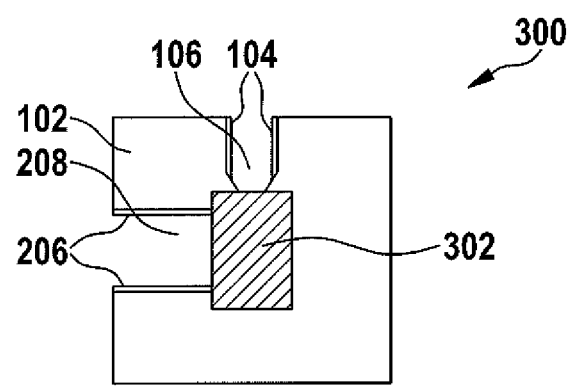
FIG. 3 shows another cross-section obtained during executing the method associated with FIG. 1.
Figure 7:
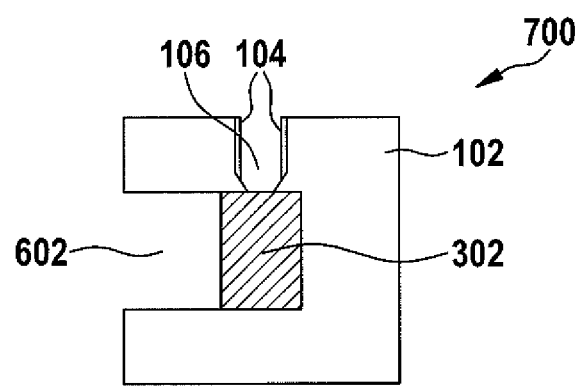
FIG. 7 shows another cross-section obtained during executing the method associated with FIG. 5.

The structure shown in FIG. 7 can therefore be denoted as a composite block 700 formed in another way as the composite block 300 shown in FIG. 3.

Figure 8:
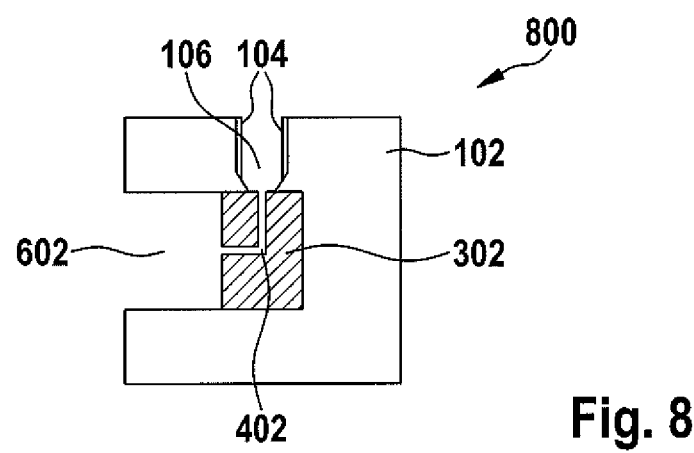
FIG. 8 shows another cross-section obtained during executing the method associated with FIG. 5.

FIG. 8 shows a component 800 according to an exemplary embodiment of the invention, in which the fluidic path 402 is again formed in the composite block 700 only after having manufactured the composite block 700. Thus, in the embodiments of the invention, at least a part of flow path formation follows the formation of the composite body. The latter therefore can be considered as a semi-finished product.

Figure 9:
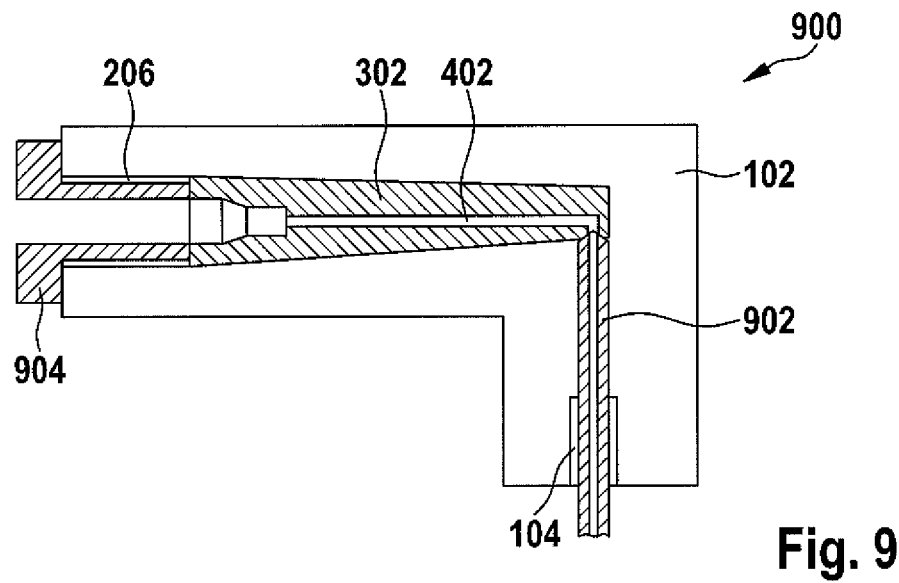
FIG. 9 illustrates an example for a component having a flow path manufactured in accordance with embodiments of the invention.

FIG. 9 shows another component 900 manufactured in accordance with an embodiment of the invention and shows a combination of a fitting and a ceramic needle 902. To obtain such a structure, firstly the metal block 102 can be processed to have a cavity therein. Subsequently, a bioinert cone-shaped block 302 may be inserted into this cavity. Afterwards, the flow path 402 may be processed within the block 302. It is then possible to insert a ceramic needle 902 into a corresponding recess and a threaded member 904 into another recess to provide fluid communication between the ceramic needle 902, the flow path 402, and the threaded member 904. The threaded member 904 and the ceramic needle 902 are only schematically indicated in FIG. 9 and also have a corresponding thread to be screwable into the internal threads 104, 206 of the metal block 102, respectively.

Figure 10:
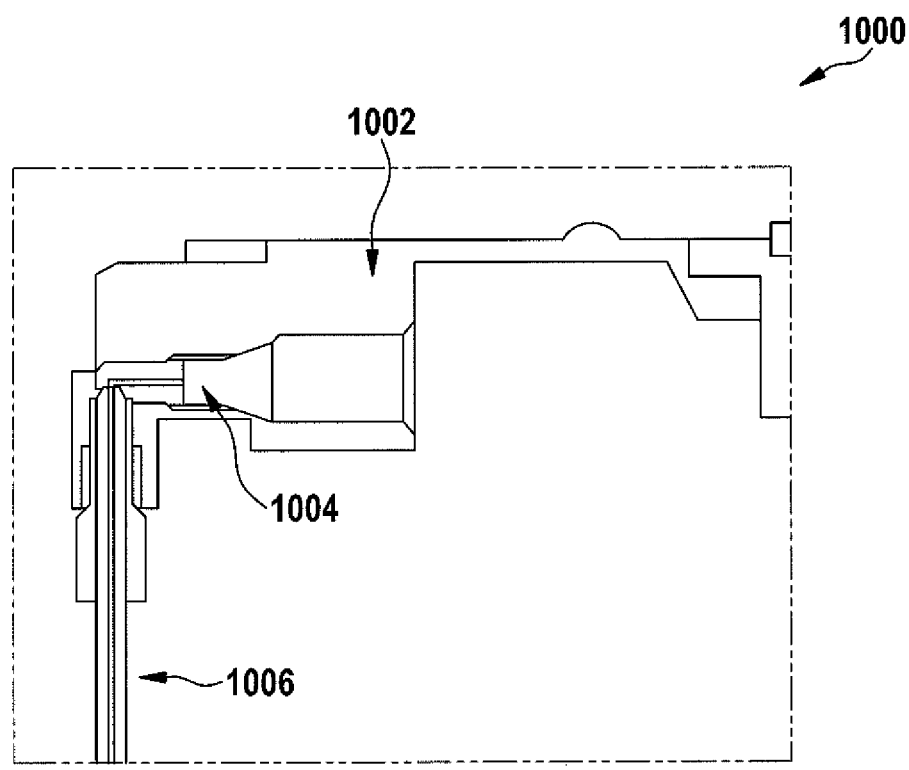
FIG. 10 shows a cross-sectional view of a fitting for a needle in a well plate sampler for a liquid chromatography apparatus according to an exemplary embodiment of the invention.

FIG. 10 shows a fitting 1000 of a needle in a well-plate sampler according to another exemplary embodiment. Reference numeral 1002 denotes a stainless steel housing provided for robustness. Reference numeral 1004 denotes a PEEK component and reference numeral 1006 denotes a ceramic component for a metal-free sample path.

Figure 11:
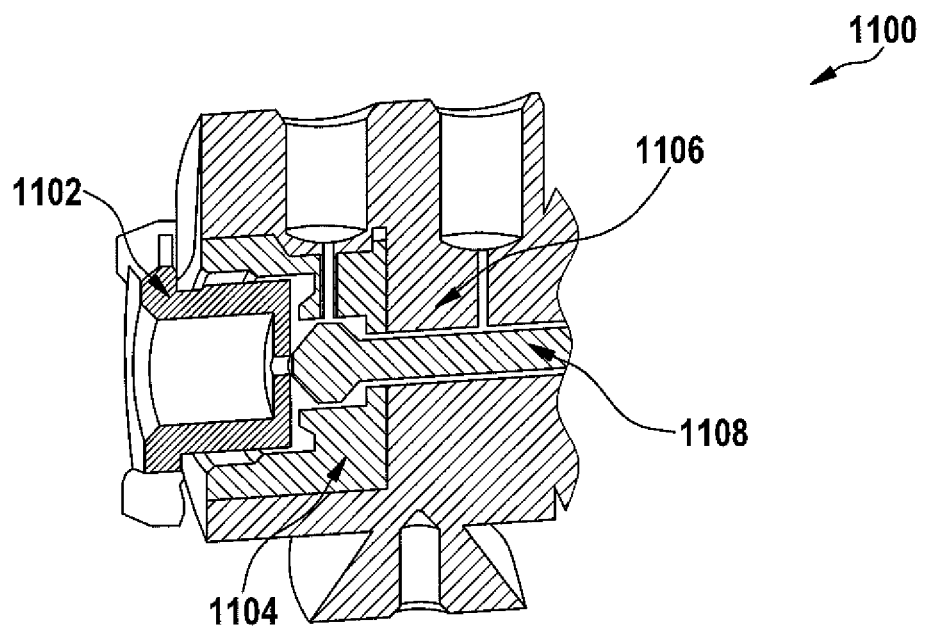
FIG. 11 shows a valve of a fluid processing apparatus according to another exemplary embodiment of the invention.

FIG. 11 shows a valve 1100 as a component according to another exemplary embodiment of the invention. A PEEK outlet is denoted with reference numeral 1102. A PEEK inlet is denoted with reference numeral 1104. A stainless steel housing is denoted with reference numeral 1106. A ceramic actuator is denoted with reference numeral 1108.

It should be noted that the term "comprising" does not exclude other elements or features, and the term "a" or "an" does not exclude a plurality. Also, elements described in association with different embodiments may be combined. It should also be noted that reference signs in the claims shall not be construed as limiting the scope of the claims.

The invention claimed is:

1. A method of manufacturing a component having a defined flow path for a liquid chromatography apparatus, the method comprising:
    forming a high pressure resistant casing with a cavity therein, wherein the cavity comprises an accommodation space and a bore communicating with the accommodation space, and the high pressure resistant casing is made of a material being pressure resistant at least up to 600 bar;
    inserting a body of bioinert material into the accommodation space to thereby form a composite block; and
    after forming the composite block, processing the composite block by removing part of the bioinert material in the accommodation space to thereby form inside the bioinert material at least one part of the defined flow path, and wherein the defined flow path at least partially extends through the body and communicates with the bore.

2. The method of claim 1, wherein the body of bioinert material comprises solid bioinert material, and
    wherein inserting the body of the bioinert material into the accommodation space comprises inserting the solid bioinert material into the high pressure resistant casing.

3. The method of claim 2, wherein inserting the solid bioinert material further comprises adhering the solid bioinert material to the high pressure resistant casing using an adhesive.

4. The method of claim 2, wherein inserting the solid bioinert material further comprises:
    effecting a temperature difference between the solid bioinert material and the high pressure resistant casing so that a temperature of the solid bioinert material is below a temperature of the high pressure resistant casing,
    inserting the solid bioinert material into the high pressure resistant casing, and
    subsequently thermally equilibrating the solid bioinert material and the high pressure resistant casing.

5. The method of claim 1, wherein inserting the body of the bioinert material into the accommodation space comprises injecting the bioinert material in a liquid state into the accommodation space, and subsequently solidifying the bioinert material in the accommodation space to form the composite block in which the bioinert material is a solidified bioinert material, wherein processing the composite block comprises forming the defined flow path so as to extend into the solidified bioinert material.

6. The method of claim 1, wherein the composite block is further processed so that the defined flow path is delimited exclusively by the bioinert material without direct contact between material of the high pressure resistant casing and a fluid to be conducted along the defined flow path.

7. The method of claim 1, wherein the processing comprises at least one of turning, milling, pressing, drilling, etching, and eroding the composite block.

8. The method of claim 1, wherein the method further comprises forming at least one thread exclusively in material of the high pressure resistant casing.

9. The method of claim 1, wherein the composite block is further processed for at least partially forming at least one of a thread and a guide structure for connection to the defined flow path.

10. The method of claim 1, wherein the high pressure resistant casing comprises one selected from the group consisting of a metal, stainless steel, construction steel, and titanium.

11. The method of claim 1, wherein the bioinert material comprises one selected from the group consisting of a plastic, a polymer, polyetheretherketone, polytetrafluoroethylene, a ceramic, aluminum oxide, zirconium oxide, and yttrium-stabilized zirconium oxide.

12. The method of claim 1, wherein the body of the bioinert material is at least partially embedded in and surrounded by material of the high pressure resistant casing.

13. The method of claim 1, wherein the defined flow path is formed with a diameter in a range between 25 μm and 1000 μm.

14. The method of claim 1, wherein:
    the bore is a first bore;
    forming the high pressure resistant casing comprises forming the high pressure resistant casing with a second bore communicating with the accommodation space; and
    after forming the composite block, the processing of the composite block comprises forming the defined flow path such that the defined flow path extends through the body to communicate with both the first bore and the second bore.

15. The method of claim 1, wherein the material of the high pressure resistant casing is pressure resistant at least up to 1200 bar.

16. The method of claim 1, wherein the component for the liquid chromatography apparatus is selected from the group consisting of: a component for a fitting; a component for an injection needle; and a component for a fluidic valve.

17. The method of claim 1, wherein the defined flow path is formed with a diameter in a range between 50 µm and 500 µm.

18. The method of claim 1, wherein the accommodation space is formed in the high pressure resistant casing with an undercut, and inserting the body of bioinert material into the accommodation space includes inserting a portion of the body of bioinert material into the undercut.

19. The method of claim 1, wherein the defined flow path has a diameter smaller than a diameter of the bore.

20. A method of manufacturing a component having a flow path for a liquid chromatography apparatus, the method comprising:

forming a high pressure resistant casing with a cavity therein, wherein the cavity comprises an accommodation space and a bore communicating with the accommodation space, and the high pressure resistant casing is made of a material being pressure resistant at least up to 600 bar;

inserting a body of bioinert material into the accommodation space to thereby form a composite block; and after forming the composite block, processing the composite block by removing part of the bioinert material in the accommodation space to thereby form inside the bioinert material at least one part of the defined flow path, wherein the defined flow path at least partially extends through the body and communicates with the bore, and wherein the accommodation space is formed in the high pressure resistant casing with an undercut, and inserting the body of bioinert material into the accommodation space includes inserting a portion of the body of bioinert material into the undercut.

21. The method of claim 20, wherein inserting the body of the bioinert material into the accommodation space comprises injecting the bioinert material in a liquid state into the accommodation space, and subsequently solidifying the bioinert material in the accommodation space to form the composite block.

22. The method of claim 20, wherein the defined flow path has a diameter smaller than a diameter of the bore.

* * * * *